(12) United States Patent
Harvell et al.

(10) Patent No.: US 6,272,838 B1
(45) Date of Patent: Aug. 14, 2001

(54) METHOD AND APPARATUS FOR CONTROLLING THE INLET DUCT LEADING TO AN AUXILIARY POWER UNIT

(75) Inventors: John K. Harvell; Joseph W. Michalski, Jr.; Craig A. Freeman, all of Phoenix, AZ (US)

(73) Assignee: AlliedSignal, Inc., Morris Township, NJ (US)

( * ) Notice: Subject to any disclaimer, the term of this patent is extended or adjusted under 35 U.S.C. 154(b) by 0 days.

(21) Appl. No.: 09/257,389

(22) Filed: Feb. 25, 1999

(51) Int. Cl.[7] ..................................... F02C 6/18
(52) U.S. Cl. ................ 60/39.02; 60/39.07; 60/39.29; 60/39.141; 244/58
(58) Field of Search ............... 60/39.07, 39.23, 60/39.29, 39.02, 39.141, 226.3; 244/58

(56) References Cited

U.S. PATENT DOCUMENTS

| | | |
|---|---|---|
| 3,109,610 * 11/1963 | Quenzler et al. | 244/15 |
| 3,711,044 * 1/1973 | Matulich | 244/118.5 |
| 4,025,008 5/1977 | Peikert . | |
| 4,121,606 * 10/1978 | Holland et al. | 137/15.1 |
| 4,174,083 * 11/1979 | Mohn | 244/53 B |
| 4,203,566 * 5/1980 | Lord | 244/57 |
| 4,275,560 * 6/1981 | Wright et al. | 60/226.3 |
| 4,292,802 * 10/1981 | Snow | 60/204 |
| 4,370,560 1/1983 | Faulkner et al. . | |
| 4,418,879 * 12/1983 | Vanderleest | 244/53 B |
| 4,523,603 6/1985 | Peikert . | |
| 4,655,413 * 4/1987 | Genssler et al. | 244/53 B |
| 4,834,622 5/1989 | Schuh . | |
| 5,265,408 * 11/1993 | Sheoran et al. | 60/39.02 |
| 5,655,359 * 8/1997 | Campbell et al. | 60/39.02 |
| 6,082,669 * 7/2000 | Bardagi et al. | 244/53 B |

* cited by examiner

*Primary Examiner*—Charles Freay
*Assistant Examiner*—Ehud Gartenberg
(74) *Attorney, Agent, or Firm*—Robert Desmond, Esq.

(57) ABSTRACT

For gas turbine engine mounted in an aircraft, a closed loop control system, and method therefor, for the inlet duct is provided. Under this control system the flow area of the inlet duct is varied by opening and closing a duct door. The control assures that the position of the door is such that the delta P across the engine will not inhibit the starting of the engine in flight.

17 Claims, 3 Drawing Sheets

METHOD AND APPARATUS FOR CONTROLLING THE INLET DUCT LEADING TO AN AUXILIARY POWER UNIT

TECHNICAL FIELD

This invention relates generally to controls and methods for gas turbine engines and in particular to a control and method for adjusting the geometry of an inlet duct leading to a gas turbine engine.

BACKGROUND OF THE INVENTION

Auxiliary power units (APUs) are gas turbine engines used on aircraft to supply pneumatic power and/or shaft horsepower in lieu of the primary propulsion engines. Typically, the APU is mounted in the tailcone of the aircraft, see FIG. 1, though on some airplanes such as the Boeing 727, the APU is mounted in the wheelwell. Because the APU is inside the aircraft an inlet duct 15 is required to bring air from outside the airplane to the APU. These inlet ducts generally have a door that is open when the APU is running and closed when the APU is shutdown. When the APU is needed during flight the door is opened and because the aircraft is moving, air is rammed or pushed through the inlet to the APU. This ram effect causes the pressure to rise in the duct which creates a positive pressure ratio between the compressor inlet of the APU and the. exhaust of the APU. This pressure ratio is referred to as engine delta P. If the delta P becomes too large; the APU may experience difficulty in starting.

One proposed solution has been the use of an open loop control system. Under this system, a predetermined door position table is incorporated into the APU's electronic control unit. The electronic control unit receives signals indicative of the APU's operating condition enters the door position table and generates a predetermined door position signal. The door then moves in response to this signal. A disadvantage to the open loop system is that the table is only accurate for steady state aircraft conditions. Any changes in pitch or attitude are not compensated for and can result in unacceptable engine delta P and difficulty in starting the APU can occur.

Accordingly, a need exists for an improved inlet control system that overcomes the disadvantages of the prior art.

SUMMARY OF THE INVENTION

The present invention provides an inlet control system for a auxiliary power unit (APU) that will adjust the geometry of the inlet to the engine until an acceptable delta P is achieved. The desired delta P is selected so that it will not inhibit the engine from being started at its present operating conditions. The control includes a first function generator that generates a desired inlet duct flow area signal. A second function generator generates a signal of the desired delta P. The actual delta P is measured and the difference between the actual and desired is processed. A summer adds the processed signal to the desired inlet duct flow area signal to generate an inlet command signal.

DESCRIPTION OF THE PREFERRED EMBODIMENT

The figures are intended to illustrate the general manner of construction and are not to scale. In the description and in the claims the terms left, right, front and back and the like are used for descriptive purposes. However, it is understood that the embodiment of the invention described herein is capable of operation in other orientations than is shown and the terms so used are only for the purpose of describing relative positions and are interchangeable under appropriate circumstances.

Figure 1:
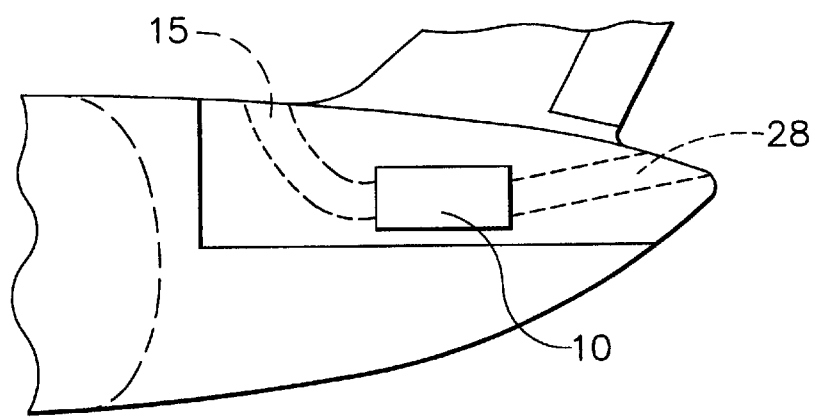
FIG. 1 is an illustration of an auxiliary power unit mounted in an aircraft.
Figure 2:
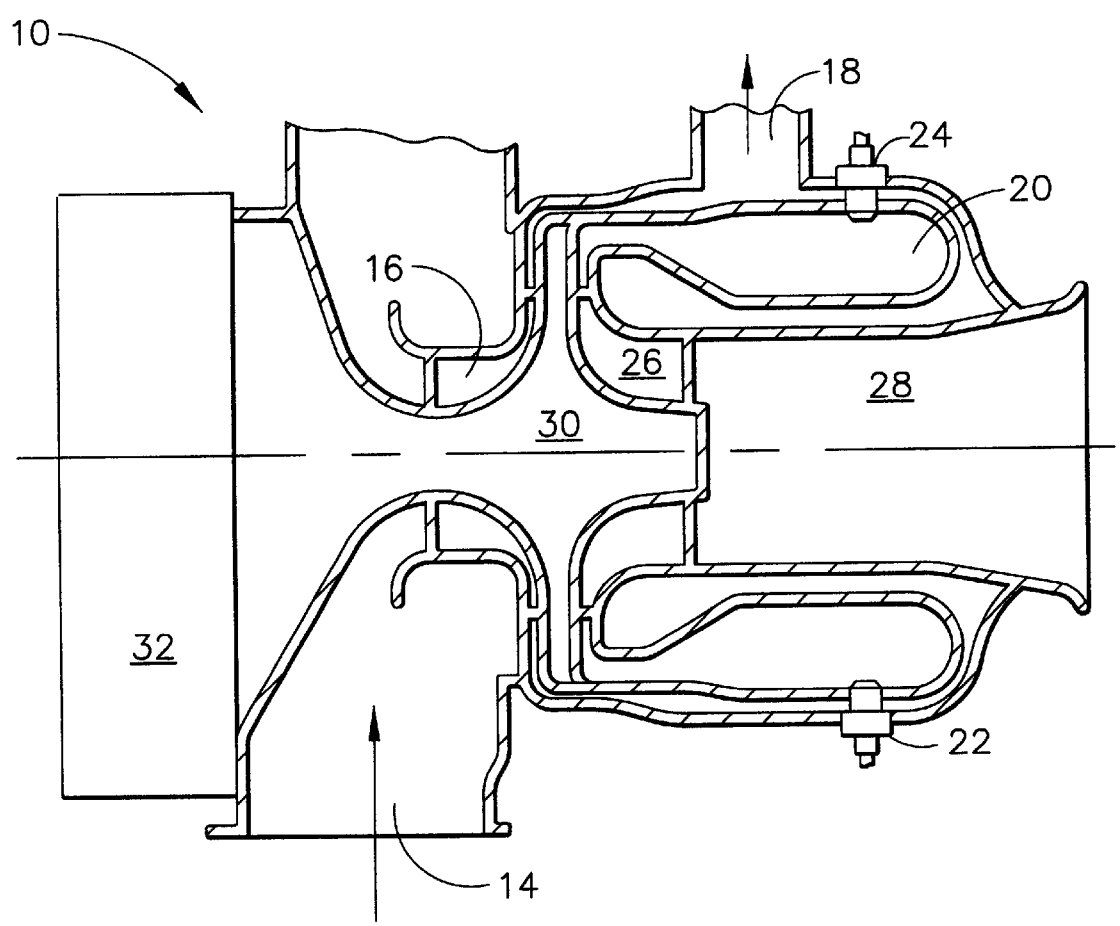
FIG. 2 is a schematic cross-section of an exemplary gas turbine auxiliary power unit.

Referring to FIG. 2, one form of an auxiliary power unit (APU) to which the present invention relates is generally denoted by reference numeral 10. The APU 10 includes in flow series arrangement a compressor inlet 14, a compressor 16, a bleed port 18 for providing compressed air to the aircraft, a combustor 20 having a primary fuel nozzle 22 and a secondary fuel nozzle 24, a turbine 26 and a gas exhaust 28. The compressor 16 and the turbine 26 are mounted for rotation on a shaft 30 that extends to and drives a gearbox 32. Upon rotation of the shaft 30, air is inducted through the inlet 14 and pressurized in the compressor 16. Any required bleed air flows through bleed port 18 with the remaining air flowing into the combustor 20. In the combustor 20 the air is mixed with fuel and ignited to form a hot pressurized gas. This gas expands across the turbine 26, causing the turbine 26, shaft 30, compressor 16 and gearbox 32 to rotate. The expanded gas then flows through the exhaust 28 and out into the surrounding ambient environment. This type of APU is referred to as an integral bleed machine. The present invention, however, can also be used with differently configured gas turbine engines.

Figure 3:
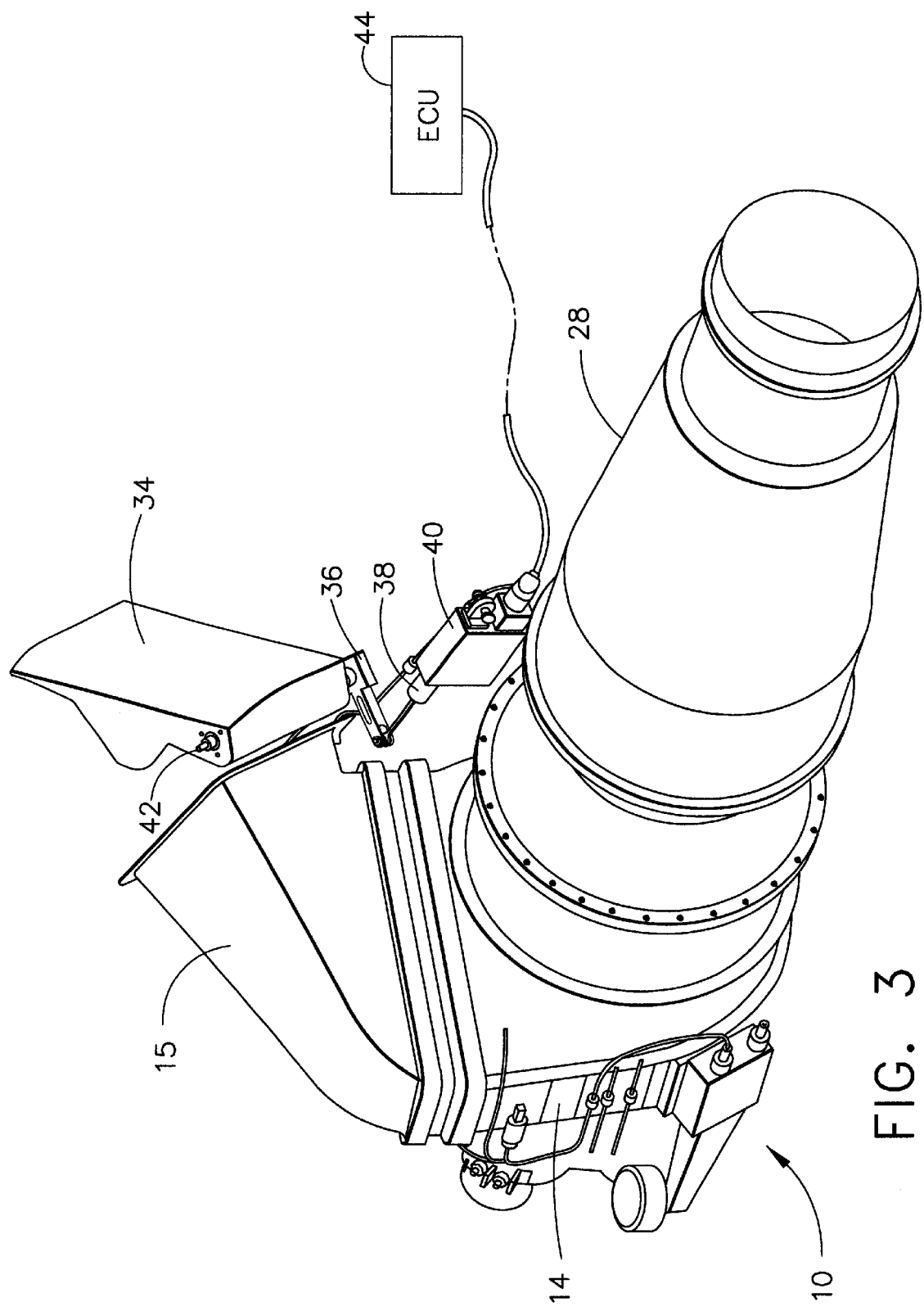
FIG. 3 is a perspective view of an exemplary gas turbine auxiliary power unit having an inlet geometry of the preferred embodiment

Referring to FIG. 3, an inlet duct 15 extends from the compressor inlet 14 to the fuselage of the airplane so that ambient air can be ingested. Referring to FIG. 3, the duct 15 has a variable geometry. The term variable geometry means that the flow area of the duct 15 can be varied. In preferred embodiment, this is accomplished by a door 34 mounted to the duct 15 that is rotatable continuously between a fully open position, (flow area is at 100 percent) and a closed position, (flow area 0 percent). Alternatively, the door 34 may be mounted to the aircraft's fuselage or the door may be mounted within the duct itself. A bell crank 36 rotates the door 34 to the commanded position. An actuator rod 38, which is coupled to actuator or 40, connects the bell crank 36 to a conventional radial variable differential transducer (RVDT) 42. The position of the door 34 is communicated to the ECU 44 by the RVDT 42. The actuator receives a door a position command signal from the engine's ECU 44 and moves the door until the desired position is obtained. In alternative embodiments, the variable geometry can be achieved through a wide variety of devices. For example, instead of a door, the inlet may have a plurality of vanes that rotated in unison between a fully open and a closed position, or the duct itself can be constructed to contract and expand, or a valve may be mounted in the duct, or a plate could be mounted to slide through the duct.

Figure 4:
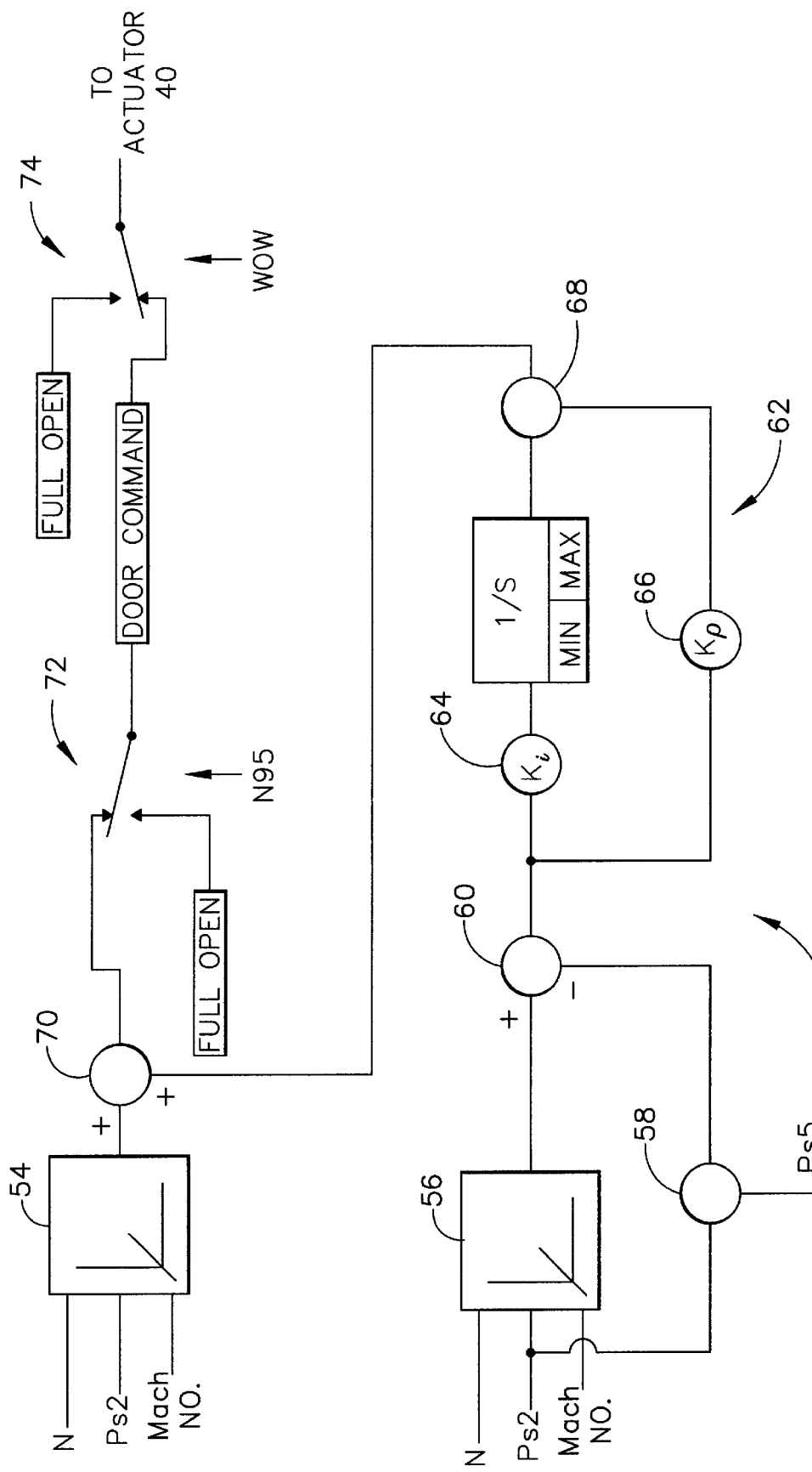
FIG. 4 is a block diagram of the inlet geometry control system contemplated by the present invention.

The ECU 44, which may be electronic or analog, governs the operation of the APU 10. Incorporated into the ECU 44 is a control system and method 50 diagrammatically illustrated in FIG. 4. The control system 50 includes a door position function block 54. In the preferred embodiment, the block 54 receives the following signals indicative of the engine's operation conditions. A signal N indicative of the rotational speed of the shaft 30, a signal Ps2 indicative of the static pressure of the air at the compressor inlet 14 and signal indicative of the Mach number or speed of the aircraft. The block 54 contains the four dimensional lookup table that takes these three inputs and generates a signal indicative of a predetermined door position. This look-up table is generated, in a manner familiar to those skilled in the art, through experimentation including altitude testing. Alternatively, instead of a look-up table an algorithm could be used. A second function block 56 also receives the speed signal N and the Ps2 signal along with a signal indicative of the Mach number or speed of the aircraft. The function block 56 contains a four dimensional look-up table that takes these three inputs and generates a signal indicative of a predetermined delta P across the APU that will allow the engine to be started under the existing engine conditions. Delta P is defined as the difference between the static pressure at the compressor inlet 14, Ps2, and the static pressure at the exit of the exhaust 28, Ps5. Alternatively, a ratio of total pressures could be used. This look-up table is also generated, in a manner familiar to those skilled in the art, through experimentation including altitude testing. Alternatively, instead of a look up table an algorithm could be used. A summer 58 subtracts the Ps5 signal from the Ps2 signal to generate a signal indicative of the actual engine delta P. This signal can also be generated by use of a delta P transducer with one measurement at Ps2 and the other at Ps5. This actual delta P signal is then combined with the desired delta P signal in a summer 60 to produce an error signal delta Pe. The error signal is then processed in a conventional integral/proportional controller 62. This controller 62 includes an integral controller 64 in parallel with a proportional controller 66. The output of controllers 62 and 64 are combined in a summer 68 to produce a door position adjustment signal which is combined with the predetermined door position signal in summer 70 to generate a commanded door position signal. This signal is then sent to the actuator 40 that moves the door 34 accordingly. These previously described steps are repeated until the error signal, delta Pe, nears zero which means that the predetermined delta P is achieved. If the APU rotational speed is approaching 100 percent of its operating speed, (shown in FIG. 4 as N95 indicating that the engine is at least at 95% speed), switch 72 flips from the commanded door position signal to a fill open signal, thus assuring that the door 34 is fully open when the APU reaches its operating speed. Likewise, if a signal from the aircraft indicates that its wheels are touching the ground, referred to as weight-on-wheels (wow) signal, switch 74 flips from the commanded door position signal to a full open signal.

Thus, a closed loop control system and method for a variable geometry inlet door is provided that will adjust the flow area of the duct until a desired engine delta P is achieved. The desired engine delta P being one that will not prevent or inhibit the starting of the engine under all required aircraft operating conditions.

Although the invention has been described in terms of the preferred embodiment, it will be appreciated by those skilled in the art that various changes and modifications may be made to this embodiment without departing from the spirit or scope of the invention as set forth in the following claims.

What is claimed is:

1. A method for controlling the delta P across a gas turbine engine disposed in a movable body having an inlet duct extending from a surface of said body to an inlet of said gas turbine engine, said duct having a variable flow area positionable continuously between a fully open position and a closed position, comprising the steps of:

sensing at least one parameter indicative of the engine's operating condition and generating a signal indicative thereof;

receiving said sensing signal and generating a signal indicative of a predetermined flow area;

receiving said sensing signal and generating a signal indicative of a desired delta P across the engine that will allow the engine to start under the engine's operating conditions indicated by said sensing signal;

sensing the actual delta P across the engine and generating a signal indicative thereof;

combining said desired delta P signal with said actual delta P signal to generate a delta P error signal;

processing said delta P error signal through an integral/proportional controller;

combining said processed delta P signal with said predetermined flow area position signal to generate a flow area command signal;

varying said flow area in response to said flow area command signal; and repeating said previous steps until the desired delta P is achieved.

2. The method of claim 1 wherein said first sensing step comprises the steps of sensing the engine's rotation speed.

3. The method of claim 2 wherein said first sensing step further includes sensing the static pressure at the engine inlet.

4. The method of claim 3 wherein said first sensing step further includes sensing the total pressure at the engine inlet.

5. The method of claim 2 wherein said second sensing step includes the step of sensing the engine's rotational speed.

6. The method of claim 5 wherein said second sensing step includes the step of sensing static pressure at the engine.

7. The method of claim 6 wherein said second sensing step includes the step of sensing the velocity of the moveable body.

8. The method of claim 1 wherein said sensing the actual delta P step includes sensing the static pressure at the exhaust of the engine.

9. The method of claim 1 further including the step of moving the flow area to its full open position, when the rotational speed of the engine approaches the engine's operating speed.

10. The method of claim 1 further including the step of moving the flow area to its full open position when the moveable body contacts the ground.

11. The method of claim 1 wherein said step of varying said flow area includes the step of opening and closing a door adjacent said inlet duct.

12. A delta P control for a gas turbine engine mounted in a moveable body having an inlet duct extending from an external surface of the body to the inlet of the gas turbine engine, said duct having a variable flow area positionable continuously between a fully open position and a closed position, comprising:

a first signal generator having predetermined inlet duct flow area positions as a function of engine operating conditions stored therein, receiving a first signal indicative of the engine's operating condition and generating a signal representative of a predetermined inlet duct flow area position;

a second signal generator having predetermined delta Ps as a function of engine operating conditions stored therein, receiving a second signal indicative of the engine's operating condition and generating a signal representative of predetermined delta P, said predetermined delta P being the delta P across the engine that will allow the engine to start under the engine's operating conditions indicated by said second signal;

means for generating a signal representative of the actual delta P across the engine;

a first summing junction for combining said predetermined delta P signal with said actual delta P signal to generate a delta P error signal;

an integral/proportional controller for processing said delta P error signal;

a second summing junction for combining said processed delta P signal with said predetermined inlet duct flow area signal to generate an inlet duct flow area position command signal; and means for varying said inlet duct flow area in response to said inlet position command signal.

13. The control of claim 12 wherein said second engine operating condition signal includes a signal indicative of the velocity of the body.

14. The control of claim 13 wherein said varying means is an actuator.

15. A delta P control for a gas turbine engine mounted in a moveable body having an inlet duct extending from an external surface of the body to the inlet of the gas turbine engine, said duct having a variable flow area positionable continuously between a fully open position and a closed position, comprising:

a first signal generator having predetermined inlet duct flow area positions as a function of engine operating conditions stored therein, receiving a first signal indicative of the engine's operating condition and generating a signal representative of a predetermined inlet duct flow area position;

a second signal generator having predetermined delta Ps as a function of engine operating conditions stored therein, receiving a second signal indicative of the velocity of the body and generating a signal representative of predetermined delta P;

means for generating a signal representative of the actual delta P;

a first summing junction for combining said predetermined delta P signal with said actual delta P signal to generate a delta P error signal;

an integral/proportional controller for processing said delta P error signal;

a second summing junction for combining said processed delta P signal with said predetermined inlet duct flow area signal to generate an inlet duct flow area position command signal; and a linear variable differential transducer actuator for varying said inlet duct flow area in response to said inlet position command signal.

16. The control of claim 14 wherein said varying means further includes a bell crank operably connected to said actuator, for positioning the variable flow area and holding the variable flow area at a proper position once such position is achieved.

17. The control of claim 12 where said variable geometry flow area is a door rotatably mounted to said inlet duct.

* * * * *